United States Patent
Fournier

(10) Patent No.: US 7,201,424 B1
(45) Date of Patent: Apr. 10, 2007

(54) SEATING ACCESSORY

(75) Inventor: Joseph R. Fournier, Clinton Township, MI (US)

(73) Assignee: Tail-Gator Distributors, L.L.C., Clarkston, MI (US)

( * ) Notice: Subject to any disclaimer, the term of this patent is extended or adjusted under 35 U.S.C. 154(b) by 0 days.

(21) Appl. No.: 11/273,142

(22) Filed: Nov. 14, 2005

(51) Int. Cl.
*B62D 25/00* (2006.01)

(52) U.S. Cl. .................................................. 296/57.1

(58) Field of Classification Search .............. 296/57.1, 296/64, 65.05; 297/344.18, 170, 153
See application file for complete search history.

(56) References Cited

U.S. PATENT DOCUMENTS

| | | | | |
|---|---|---|---|---|
| 2,702,076 | A * | 2/1955 | Beardsley et al. .......... | 297/252 |
| 5,000,504 | A * | 3/1991 | Munguia ................... | 296/57.1 |
| 5,215,346 | A * | 6/1993 | Reitzloff et al. ............ | 296/51 |
| 5,462,334 | A * | 10/1995 | Sedorcek et al. ........... | 297/252 |
| 5,971,464 | A * | 10/1999 | Davis et al. ............... | 296/57.1 |
| 5,975,610 | A * | 11/1999 | Tracy ........................ | 296/57.1 |
| 6,116,676 | A * | 9/2000 | Edwards ................... | 296/65.05 |
| 6,273,504 | B1 * | 8/2001 | Pace et al. ................ | 297/219.1 |
| 6,286,885 | B1 * | 9/2001 | Ramos ...................... | 296/57.1 |
| 6,364,391 | B1 * | 4/2002 | Everett ...................... | 296/57.1 |
| 6,588,822 | B1 * | 7/2003 | Duvall, Jr. ................. | 296/57.1 |
| D479,499 | S | 9/2003 | Cameron et al. .......... | D12/221 |
| 6,824,186 | B2 * | 11/2004 | Brown ..................... | 296/65.16 |
| 2002/0109369 | A1 * | 8/2002 | Boomhower et al. ...... | 296/57.1 |

* cited by examiner

*Primary Examiner*—Kiran B. Patel
(74) *Attorney, Agent, or Firm*—Young & Basile, P.C.

(57) ABSTRACT

A seating accessory for use in combination with the inside surface of the tailgate of a pickup truck. The accessory includes a generally rectangular sheet sized to be positioned over the lowered tailgate surface and defining two side-by-side upwardly opening concave seating surfaces to accommodate side-by-side seated persons. A backrest is associated with each seating surface and is pivotally moveable between an upright position providing back support for a person sitting on the respective seating surface, and a lowered, stowed position within the concavity of the respective seating surface. The seating access is secured to the tailgate using suitable fasteners coacting with the tailgate.

10 Claims, 5 Drawing Sheets

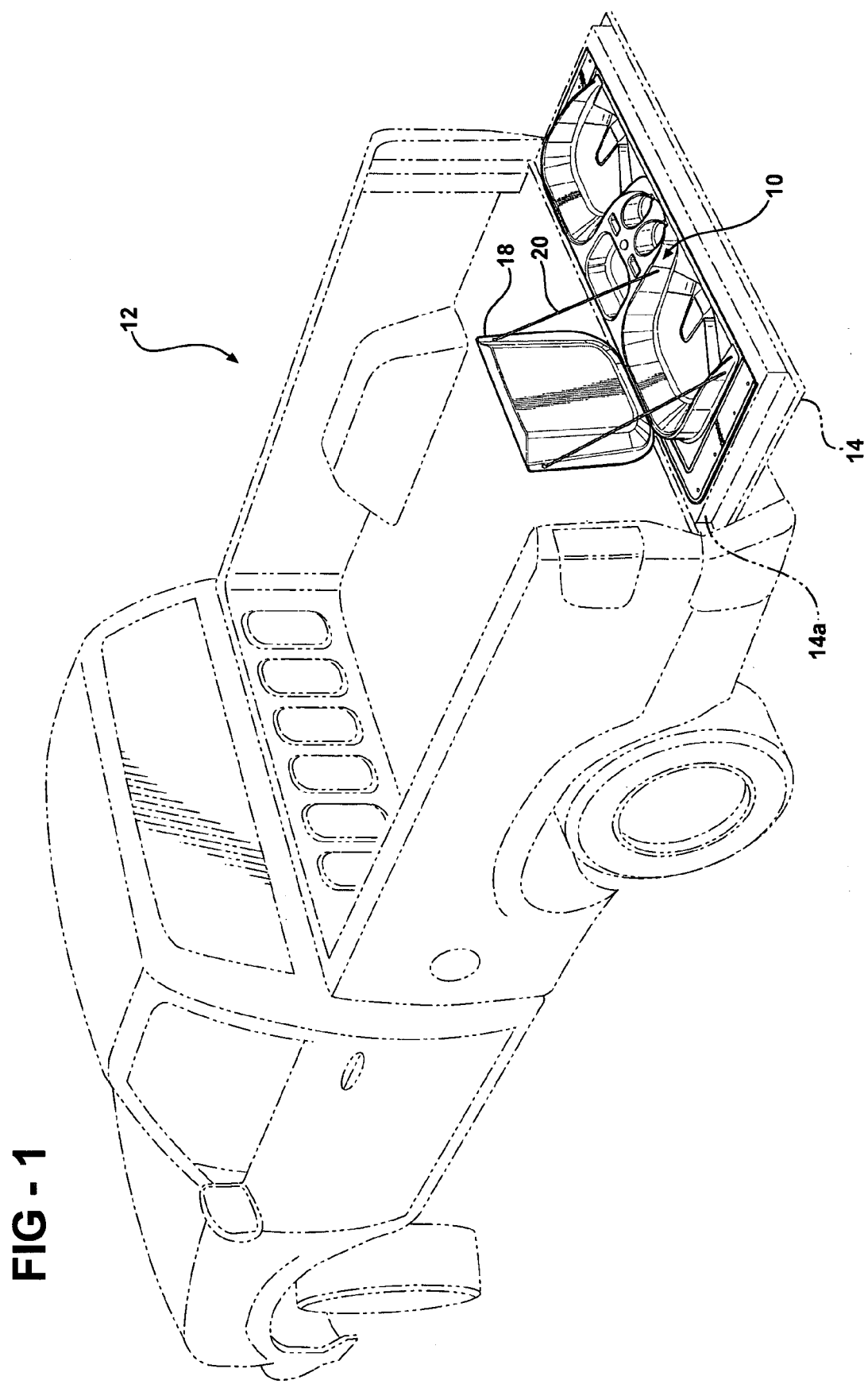

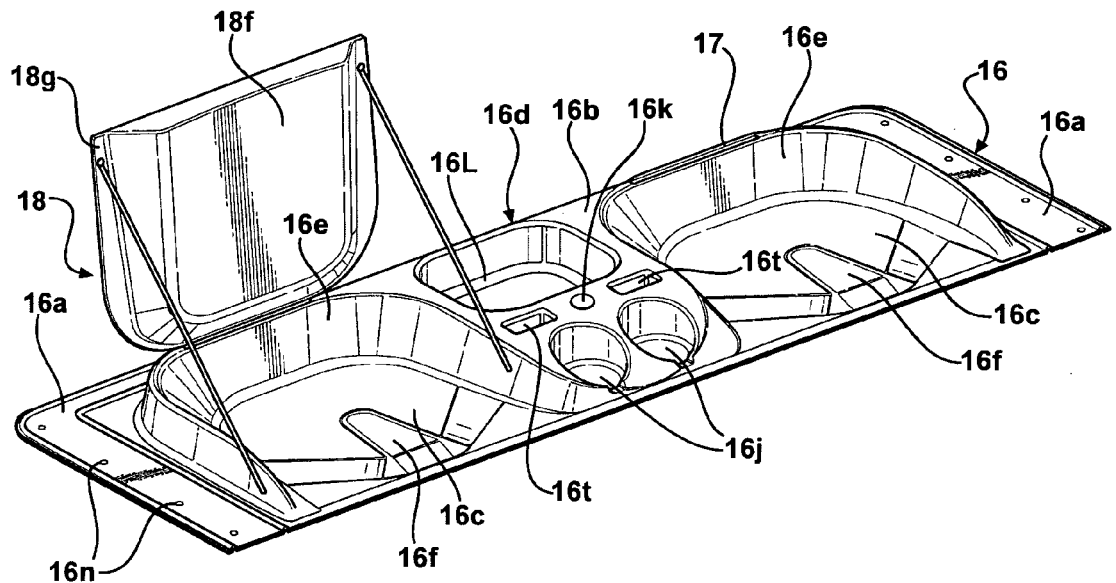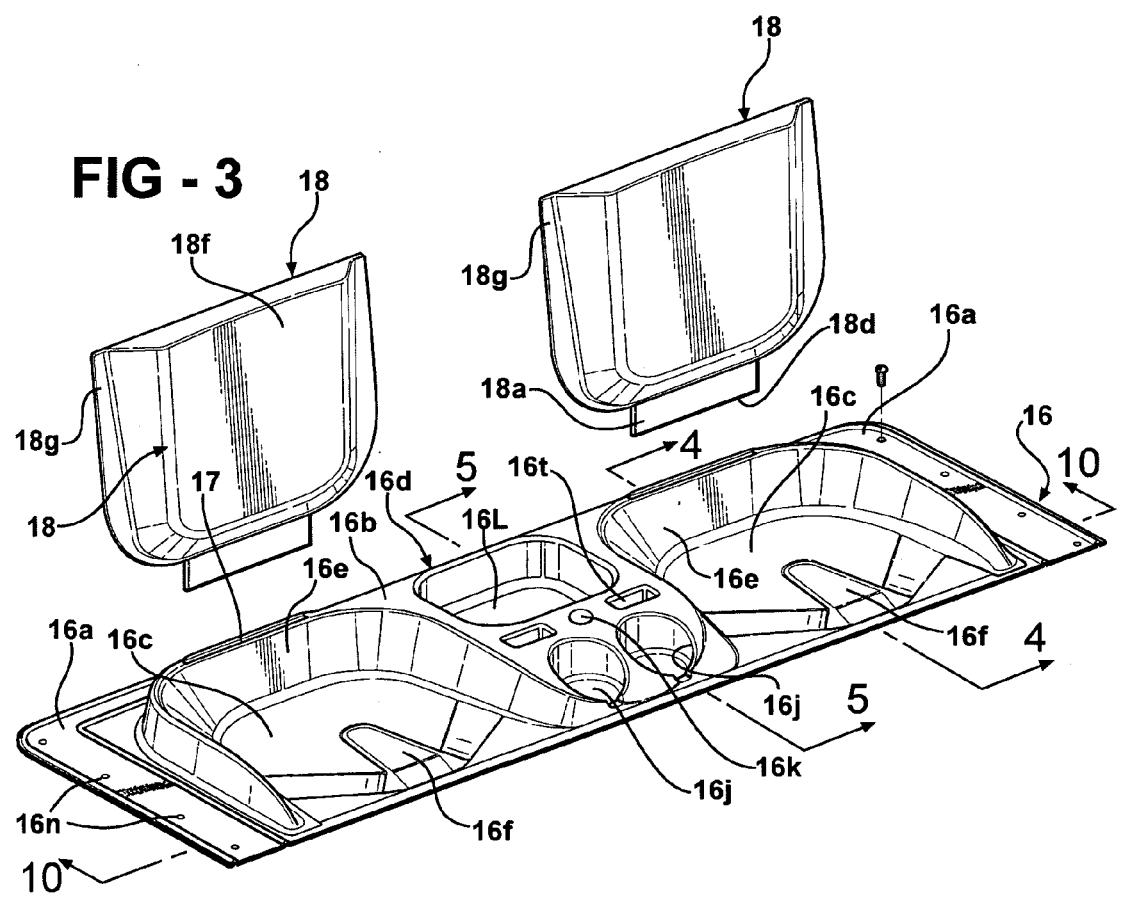

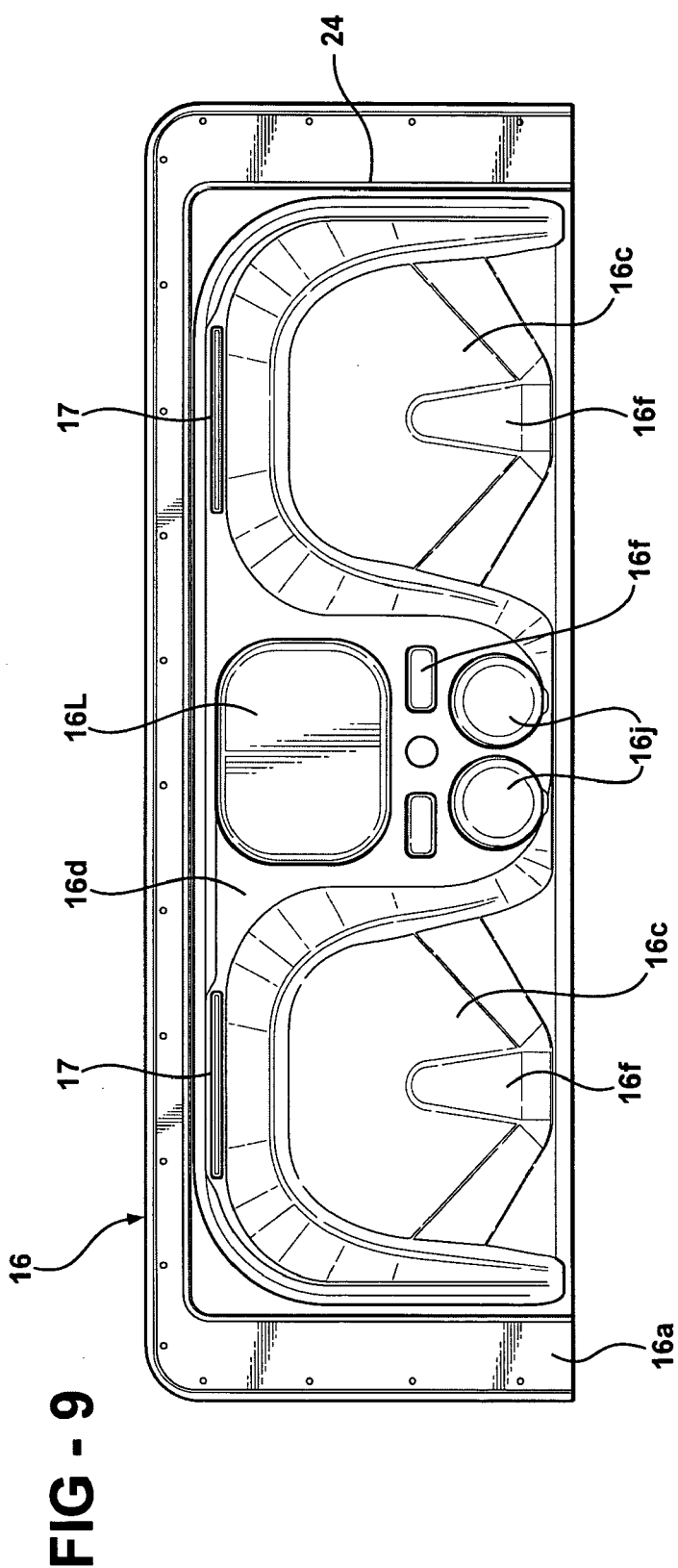
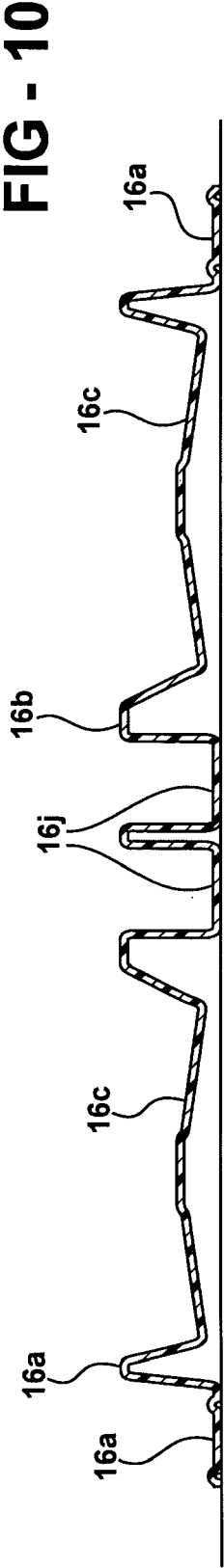

SEATING ACCESSORY

FIELD OF THE INVENTION

This invention relates to motor vehicle accessories and more particularly to a seating accessory which may be used in association with a horizontal support surface of a motor vehicle, such as a lowered tailgate, to provide comfortable outdoor seating.

BACKGROUND OF THE INVENTION

It is common practice at outdoor activities, such as sporting events, to lower the tailgate of a truck to provide a horizontal support surface for dining, seating, game playing or the like. However, for purposes of seating, the surface of a lowered tailgate is not comfortable, especially for extended periods of usage.

SUMMARY OF THE INVENTION

This invention relates to a seating accessory for motor vehicles.

More particularly, this invention relates to a seating accessory for use in association with a horizontal support surface of a motor vehicle, such as the inside of a lowered tailgate, to provide comfortable seating. According to the invention, the accessory is made of sheet material such as plastic to define a base, a raised deck and, within the deck, at least one recess defining an upwardly-opening, concave seating surface configured to accommodate a human posterior and, optionally, one or more other recesses to receive, for example, drink containers. The base area around the seating surface or surfaces is grounded to the support surface, but the seating surface or surfaces are not grounded to the support surface, but lie above the plane of the supporting surface to lend resilience to the seating surface or surfaces when under load.

In the preferred embodiment of the invention, the base member defines two side-by-side, upwardly-opening seating surfaces formed in a raised deck to accommodate two side-by-side seated persons, and additional recesses defining drink holders and the like between the seating surfaces.

Also, in the preferred embodiment, the base member is separate from the support surface and is attached thereto by screws or plastic "clips." However, the base may be original equipment to, for example, a pickup truck and may be made of metal as well as plastic.

According to an optional feature of the invention, backrests are provided for the seating surfaces. The backrests may be made, for example, of plastic and are sized and shaped to conform generally to the seating surface recesses so that the backrests may be stowed in and over the seating recesses when not in use.

In the preferred form, the backrests include a main body defining the backrest surface and an integral connector tab, and the base member further defines a slot or socket proximate the rear of the seating surface to receive the connector tab. The tab is joined to the backrest body in such a way as to form a living hinge which allows each backrest to be raised for use and lowered for storage.

According to a further optional feature, the backrests include flexible straps extending from each backrest to the base member and operative to support the backrest in its raised position. The straps may, for example, be made of Nylon webbing.

In the specific and illustrative embodiment hereinafter described, the seating accessory is used with the tailgate of a pickup truck, the inboard wall of the tailgate defining the generally flat support surface, and the base member being positioned in overlying, covering relation to the inboard wall of the lowered tailgate.

The invention also provides a methodology for providing a seating surface on a vehicular support surface.

According to the invention methodology, a cover sheet of plastic is provided substantially conforming in size and shape to the vehicular support surface; the sheet is shaped to provide an upwardly-opening, concave seating surface configured to accommodate a human posterior; and the sheet is removably attached to the vehicular support surface.

According to a further feature of the invention methodology, the vehicular support surface is defined by the inboard wall of a tailgate of a pickup truck with the tailgate in a lowered position.

According to a further feature of the invention methodology, the cover sheet is provided in a size providing excess area adjacent the seating surface and the excess area is selectively cut away to conform the cover sheet to various tailgate sizes corresponding to various sizes of pickup trucks.

According to a further feature of the invention methodology, a backrest member is provided defining a backrest surface and the backrest member is pivotally mounted on the cover sheet for movement between an upstanding operative position providing back support for a person positioned on the seating surface and a lowered, stowed position in overlying relation to the seating surface.

According to a further feature of the invention methodology, the cover sheet is shaped to provide side-by-side seating surfaces, each configured to accommodate a human buttock.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a perspective view of a truck, showing a seating accessory embodying the invention installed on the inside surface of a lowered tailgate;

FIG. 2 is a perspective view of the seating accessory;

FIG. 3 is a perspective exploded view of the seating accessory of FIG. 1;

FIG. 9 is a plan view showing the manner in which the seating accessory of the invention may readily accommodate the tailgates of various size trucks; and FIG. 10 is a cross-sectional view taken on line 10—10 of FIG. 3.

DETAILED DESCRIPTION OF THE PREFERRED EMBODIMENT

Figure 4:
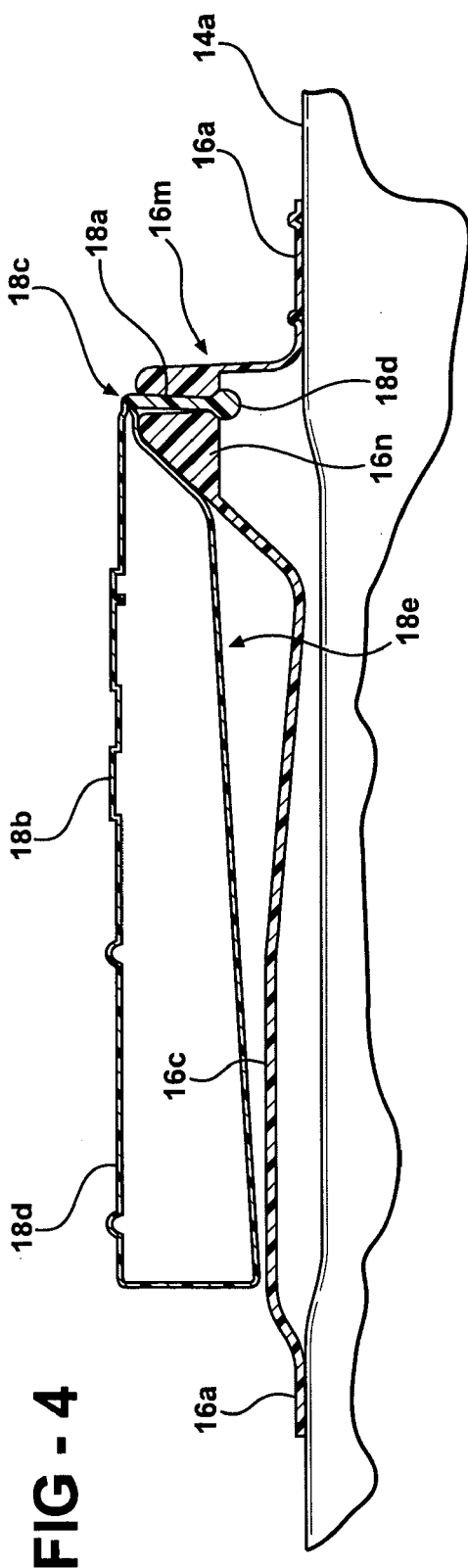
FIGS. 4 and 5 are cross-sectional views taken on lines 4—4 and 5—5 of FIG. 3.
Figure 5:
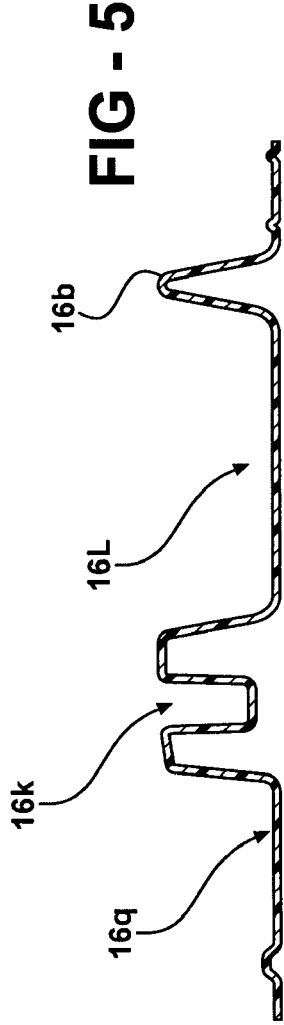
Figure 6:
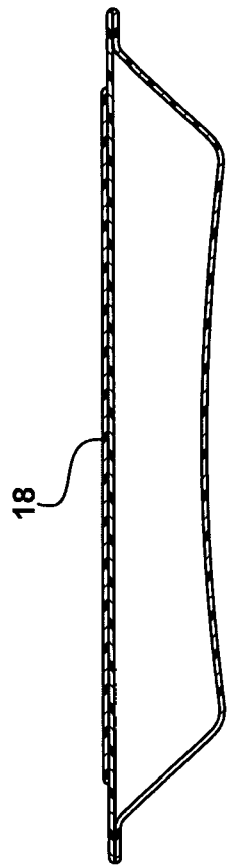
FIG. 6 is a cross-sectional view taken on line 6—6 of FIG. 7.

FIG. 1 shows a seating accessory 10 installed on the inside surface of a tailgate 14 hingedly installed on a truck 12. The inside surface 14a of the tailgate 14 is the support surface for the accessory 10.

The seating accessory 10, broadly considered, includes a rectangular plastic base member 16 and a pair of hinged backrests 18.

Base member 16 is formed as a molded sheet of plastic material having a generally rectangular configuration. Base member 16 may be formed, for example, of a polypropylene UV stabilized material and may be formed in an injection molding operation. Plastic is mentioned by way of example, i.e., the base member may alternatively be made of metal such as aluminum or steel.

Base member 16 defines a flat planar base 16a which, when the accessory is installed, is grounded on the support surface 14a. The base member defines a raised deck 16b and, within the deck portion, a pair of spaced-apart recesses 16c defining seating surfaces sized and shaped to receive a human posterior. The bottoms of the seating surfaces 16c lie above the plane of the base 16a and, therefore, are not grounded to the support surface 14a but lie above it to provide resilience for comfort and to provide a cushioning effect. A central convenience section 16d is positioned between the seating surfaces 16c and includes additional recesses of varying shapes as hereinafter described to accommodate drinks, ice, cigarette packs and other items. The recesses of the convenience section are preferably grounded, i.e., the bottoms lie against surface 14a. Each seating surface 16c is defined as an upwardly-opening, concave area configured to accommodate a human posterior. Surrounding the seating surfaces 16c are U-shaped surrounds 16e which join the seating surfaces 16c to the deck 16b. The surrounds 16e blend into the convenience section 16d at the front of the base member 16 as shown.

The seating surfaces 16c are contoured to receive and conform generally to a human posterior. In the front center of each surface 16c is a raised wedge-shaped portion 16f which lies between the contact points of a human posterior with the surface 16c to provide a feeling to the user similar to that of a motorcycle seat. The front edges of the surfaces 16c are grounded, as are the outsides of the surrounds 16e. However, the majority of the seating surfaces 16c lie above the ground plane as shown in FIG. 4 to provide flexing under load.

Central convenience section 16d defines a pair of cupholders 16j, an umbrella holder 16k, an all purpose tray 16l, and cigarette pack holders 16t.

Each surround 16e has formed in the rear portion thereof a laterally extending slot or socket 17 to receive a backrest 18 as hereinafter described.

A backrest member 18 is provided in association with each seating surface 16c. Each backrest member 18 is pivotally mounted on the base member 16 for movement between an upright operative position in which it defines a backrest surface to support the back of a person positioned on a seating surface 16c, and a stowed position in which is overlies the seating surface. In the stowed position, the backrest 18 is positioned in the concavity defining a seating surface 16c.

Figure 7:
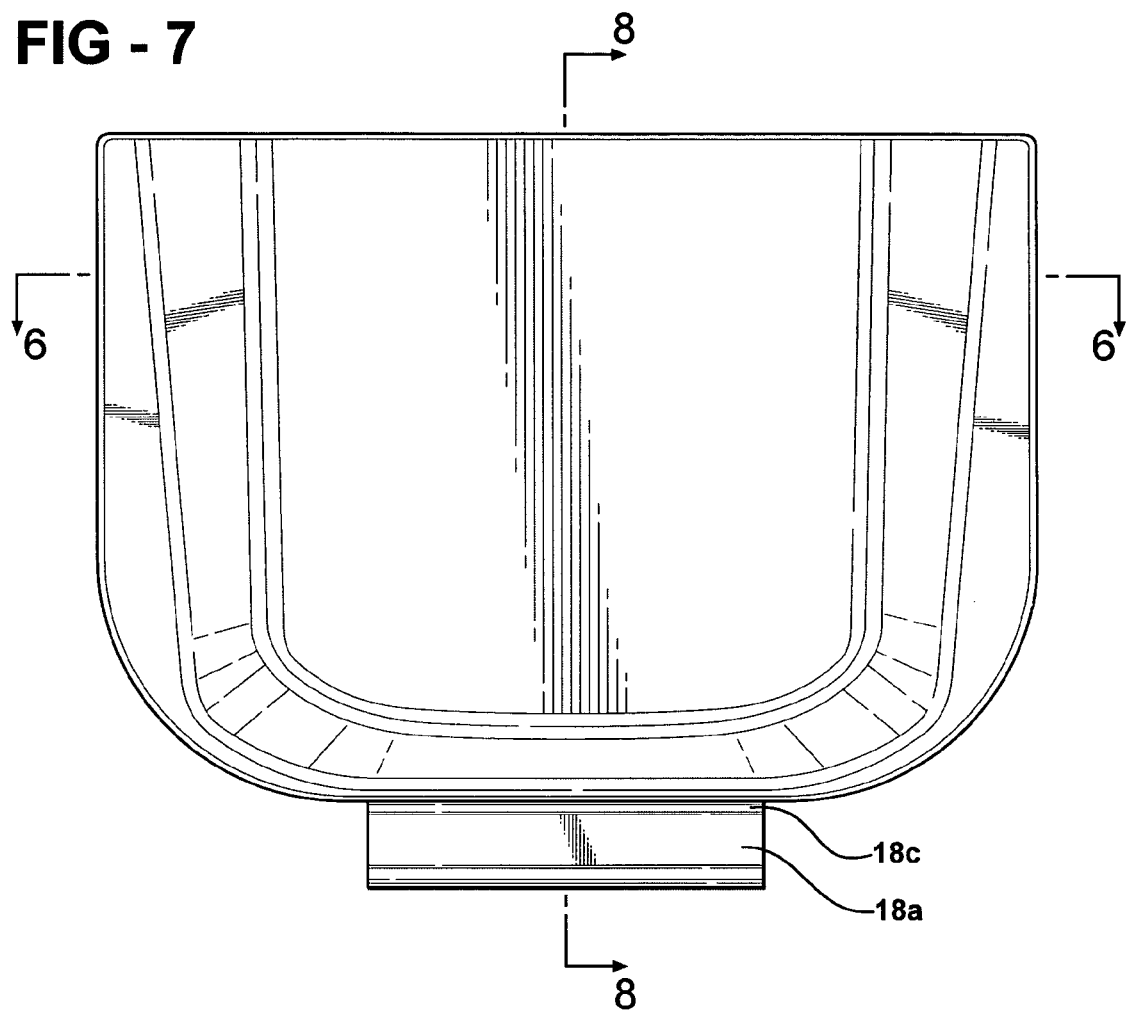
FIG. 7 is a top view of a backrest employed in the invention seating accessory.
Figure 8:
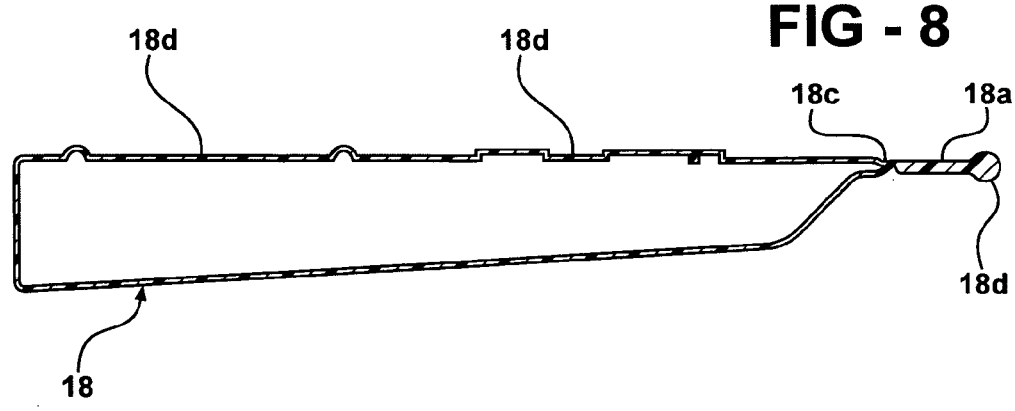
FIG. 8 is a cross-sectional view taken on line 8—8 of FIG. 7.

A pivotal connection of each backrest member 18 to the base member 16 is provided by a tab 18a connected to a rear edge of the main body 18b of the backrest via a living hinge 18c (see FIG. 7). Tab 18a is sized to fit into a respective slot 17 with a snap fit employing a bulbous end edge 18d coacting with integral ribs 16n (FIG. 4). The tab may be easily inserted, will stay in place so long as a backrest support is desired, and may be readily removed to separate the backrest 18 from the base member 16.

Backrest main body 18b is preferably formed of a polypropylene plastic material in a blow molding operation using a suitable parison or may be formed of EPP foam. The main body 18b of each backrest includes a generally planar back portion 18d and a cushion portion 18e. The cushion portion 18e is configured to be positioned within the concavity of the base member defining the respective seating surface 16c with the rear central portion 18f of the cushion portion 18e suitably bowed to accommodate the raised central plateau portion 16f of the seating surface. The cushion portion 18e will be seen to be inset with respect to back portion 18d along the side and front edges of the backrest to define a peripheral flange 18g which may seat along the upper edges of the respective seating surface 16b with the cushion portion 18de positioned in the concavity of the seating surface.

The movement of each backrest between its upright operative position and its stowed position proximate the base member 16 is provided by the living hinge 18c in coaction with the tab 18a received in the slot or socket 17. In the upright position, each backrest is further supported by a pair of flexible straps 20 extending from the backrest to the base member. The straps may be made of Nylon webbing and are connected to the accessory structure by rivets or snaps or the like.

The seating accessory 10 is secured to the support surface 14b of the lowered tailgate 14 utilizing fasteners 22 extending through suitable apertures 16n provided in main body portion 16a for engagement with suitable apertures in the tailgate surface 14. The apertures in the tailgate surface 14 may be preexisting or may be formed in the surface 14a in a drilling operation.

Fasteners 22 may, for example, comprise "Christmas tree" type fasteners extending, as seen in FIG. 10, through respective apertures 16n in the planar portion 16a of the base member for engagement with suitable apertures in the tailgate.

According to an invention methodology, and as best seen in FIG. 9, the plastic cover sheet forming the base member 16 may be provided in a size providing excess planar area 16a adjacent the seating surfaces 16c whereby the excess area may be selectively cut away to conform the cover sheet to various tailgate sizes corresponding to various sizes of trucks. Specifically, with the continued reference to FIG. 9, sheet 16 may retain the illustrated, full size solid line configuration to accommodate the tailgate of a full size pickup truck or may be cut along the line 24 to accommodate the tailgate of a mid size pickup truck.

The invention seating accessory will be seen to provide many important advantages. Specifically, the invention accessory device provides a means of providing ready, comfortable seating in an outdoor environment utilizing the horizontal support surface provided by the lowered tailgate of a truck; the seating accessory may be readily attached to the tailgate; and the accessory, by virtue of its light weight and compact size, may be readily stowed when not in use. As indicated above, the accessory may be an aftermarket item added to a pre-existing tailgate. Alternatively, it may be integrated into the tailgate by the vehicle manufacturer as original equipment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A seating structure for use with the inside surface of a motor vehicle tailgate comprising:

a base member of flexible sheet material configured to overlie and cover the tailgate surface and defining a raised deck and at least one upwardly opening, concave seating surface configured to accommodate a human posterior;

said base member having contact portions around the seating surface which engage the tailgate surface, the seating surface being substantially entirely raised above the tailgate surface to be spaced therefrom when said structure is installed on said tailgate surface to allow flexing of the seating surface under load.

2. The seating structure according to claim 1, wherein: the base member defines two side-by-side upwardly opening seating surfaces to accommodate two side-by-side seated persons.

3. The seating structure according to claim 1, wherein the base member is formed of a single sheet of molded plastic material.

4. The seating structure according to claim 3, wherein the base member is formed in an injection molded process.

5. The seating structure as defined in claim 1 further including a seat back conforming in shape and size to said seating surface, and an attachment member for attaching the seat back to the base member rearwardly of the seating surface.

6. The seating structure according to claim 1, wherein:

the base member has a generally rectangular configuration, including a front edge and a rear edge;

the concave seating surface is defined by an upwardly extending back seating surface portion proximate the front edge of the base member and confronting upwardly extending side seating surface portions extending forwardly from the back seating surface portion to a location proximate the rear edge of the base member; and the seating surface is open proximate the front edge of the base member.

7. The seating structure according to claim 6, wherein the seating surface further includes a raised portion proximate the front edge of the base member centrally between the side seating surface portions.

8. The seating structure according to claim 5 wherein:

the seatback includes a main body defining a backrest surface and a connector tab; and the base member further defines a socket proximate the back seating surface portion sized to receive the connector tab.

9. The seating structure according to claim 8, wherein the connector tab is joined to the main body of the backrest by a live hinge.

10. The seating structure according to claim 6, wherein the accessory further includes flexible straps extending from the backrest to the base member and operative to support the backrest in a vertical position.

* * * * *